(12) United States Patent
Wu et al.

(10) Patent No.: US 9,704,042 B2
(45) Date of Patent: Jul. 11, 2017

(54) PREDICTING TREE SPECIES FROM AERIAL IMAGERY

(75) Inventors: Xiaqing Wu, San Mateo, CA (US); Lin Yang, Birmingham, AL (US)

(73) Assignee: GOOGLE INC., Mountain View, CA (US)

( * ) Notice: Subject to any disclaimer, the term of this patent is extended or adjusted under 35 U.S.C. 154(b) by 1091 days.

(21) Appl. No.: 13/166,356

(22) Filed: Jun. 22, 2011

(65) Prior Publication Data
US 2015/0161780 A1    Jun. 11, 2015

(51) Int. Cl.
*G06K 9/00*    (2006.01)
*G06K 9/46*    (2006.01)
*G06K 9/62*    (2006.01)

(52) U.S. Cl.
CPC ....... *G06K 9/00657* (2013.01); *G06K 9/4642* (2013.01); *G06K 9/6223* (2013.01)

(58) Field of Classification Search
None
See application file for complete search history.

(56) References Cited

U.S. PATENT DOCUMENTS 7,212,670 B1 *    5/2007    Rousselle et al. ............ 382/173
2009/0154795 A1 *    6/2009    Tan et al. ..................... 382/155

OTHER PUBLICATIONS

Tree Detection From Aerial Imagery, Nov. 2009, Lin Yang and Xiaqing Wu, Emil Praun, and Xiaoxu Ma.*
Multi-Channel Texture Classification Applied to Feature Extraction in Forestry, 2005. Christian Korber, Dietmar P.F. Moller, and Christoph Katsch.*
A Model-Based Approach to Automatically Locating Tree Crowns in High Spatial Resolution Images, 1994, R.J. Pollock.*

* cited by examiner

*Primary Examiner* — Delomia L Gilliard
(74) *Attorney, Agent, or Firm* — Marshall, Gerstein & Borun LLP

(57) ABSTRACT

Embodiments determine the species of trees present in an aerial image. Tree crowns are detected in a received image, and represented as histograms of their color, texture and entropy features. Similar trees are clustered together. Using classification techniques, each cluster is assigned the closest species. The species information for each tree may be used in a rendering of the tree in geographical information systems.

11 Claims, 3 Drawing Sheets

PREDICTING TREE SPECIES FROM AERIAL IMAGERY

BACKGROUND

Field

Embodiments relate to species prediction of detected trees in an aerial image.

Background

Geographical information systems exist that allow users to view various locations around the Earth. The geographical information system may display aerial or satellite imagery texture-mapped to the surface of the Earth to create an accurate three-dimensional rendering of the portion of the Earth being viewed. If the viewed area includes trees, three-dimensional models of those trees may be included in the rendering.

In geographical information systems, three-dimensional models of trees may be rendered according to their crown size and species. However, accurately determining which species to render for a particular tree or set of trees may be difficult. Thus, other data may be used to provide an approximation of the distribution of various tree species.

For example, it may be known that for a given area being viewed by a user of a geographical information system, such as an area of San Francisco, Calif., 50% of the trees in the area are pine trees, 30% are broadleaf, and 20% of the trees are various other species. Thus, when rendering an image of the area in a geographical information system, the images of the trees may match to the known distribution of the trees.

Such a rendering may not be entirely accurate, however. Although the distribution may be correct for the given area, the rendering may not accurately represent the positioning of various tree species. That is to say, one portion of the viewed area may have a great number of broadleaf trees, while another portion may have no broadleaf trees. As stated above, while the distribution of the trees may result in a rendering of 30% broadleaf trees, the positioning of the trees may not be known.

BRIEF SUMMARY

According to an embodiment, a method of determining the tree species for a group of trees in an aerial image is disclosed. An aerial image is received. One or more tree crowns in the aerial image are detected. Each detected tree crown is represented as a color, texton (e.g. quantized texture feature) and entropy histogram. The dimensionality of each tree crown color, texture and entropy histogram is reduced. The histograms are clustered into one or more clusters. These clusters are then assigned to a tree species.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
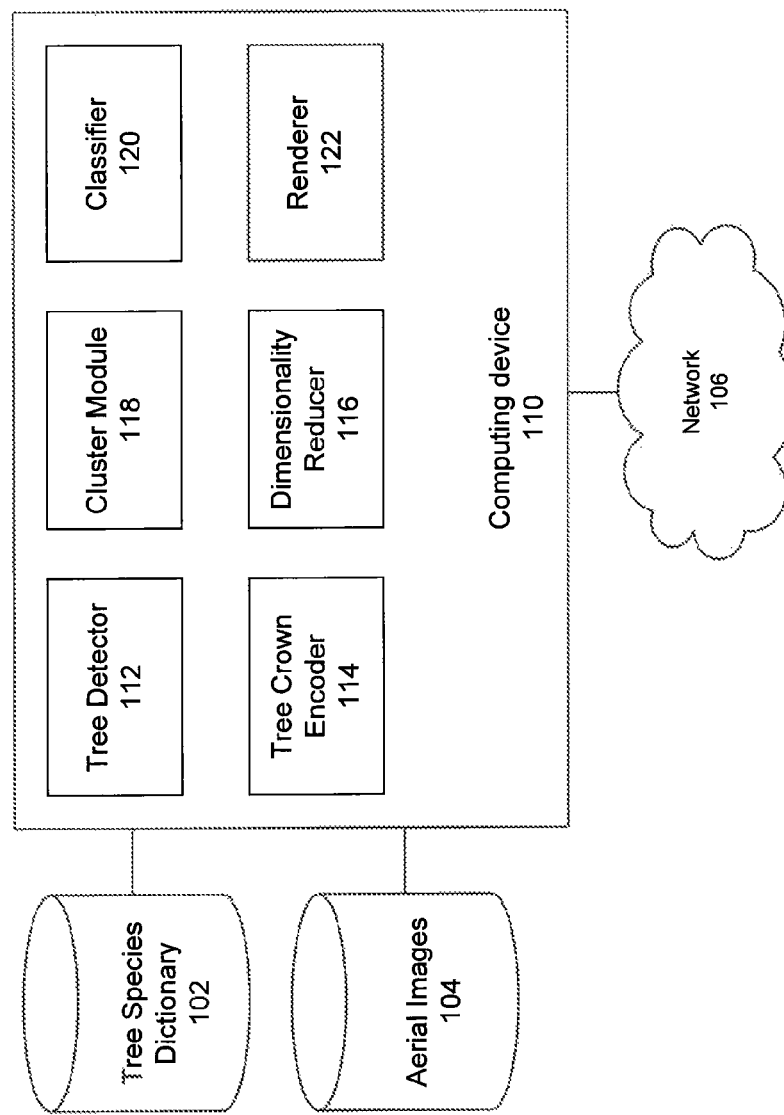
FIG. 1 is a diagram of a tree species detection system in accordance with an embodiment.

Embodiments relate to determining the species for trees in aerial imagery. Trees in a received aerial image may be detected and clustered together based on their color, textural and entropy similarities. Each cluster may be assigned to a tree species according to a classifier. The tree species information may be used to improve renderings of three-dimensional trees in a geographical information system.

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Geographic information systems (GIS) provide users with representations or renderings of various locations around the Earth, and data related to those locations. Data may be related to features of the land at the location, such as streets, buildings, trees, or other features.

Aerial imagery captures a wide variety of natural and man-made objects on Earth. Aerial imagery, as used herein, includes imagery captured from a perspective above the ground. Such aerial imagery may include imagery captured from a tower, building or plane and may also include satellite imagery or airborne imagery. Buildings, roads, trees, and other objects may be present in captured aerial imagery. Detecting such objects may benefit geographical information systems. Embodiments of the present invention are directed to the detection of tree species from aerial imagery. Detection of tree species can assist in various applications such as urban planning and 3D city modeling.

Accurately determining where a group of trees belonging to a given species exists may improve renderings in geographical information systems. Detecting trees present in aerial images may be possible with the assistance of machine learning algorithms. An aerial image may be segmented into tree and non-tree sections, and tree crowns may be identified in the tree sections, as described in U.S. patent application Ser. No. 12/836,849, titled "Tree Detection From Aerial Imagery", filed Jul. 15, 2010, which is hereby incorporated by reference.

Once trees are detected, similar trees may be clustered together. The species of a given cluster or group of trees in the aerial image may be determined. That information may be used to render the distribution of trees in a geographical information system such that the rendering accurately displays how trees are distributed in the viewed area.

FIG. 1 is a diagram of a system 100 in accordance with embodiments. System 100 may include computing device 110. Computing device 110 may be connected to tree species dictionary 102, which may be implemented, for example and without limitation, in a database. Further, computing device 110 receives aerial images 104. Aerial images 104 may be stored, for example and without limitation, in a database.

Computing device 110 includes tree detector 112. Tree detector 112 may detect tree crowns in an image in accordance with known methods, as described above, by segmenting an aerial image into tree and non-tree sections. For example, tree detector 112 may detect trees by segmenting an aerial image into tree and non-tree sections and by further detecting tree crowns in the tree sections.

Computing device 110 may also include tree crown encoder 114. Tree crown encoder 114 may represent tree crowns detected by tree detector 112 as a histogram of color, quantized texture features, and entropy.

Computing device 110 may also include dimensionality reducer 116. Dimensionality reducer 116 may use Principal Component Analysis or other techniques to reduce the dimensionality of histograms generated by tree crown encoder 114. For example, the histograms generated by tree crown encoder 114 may include the levels of all colors for those colors in the red, green and blue (RGB) space, represented by values in the L*a*b color space. The histogram may also include the texton histograms and the entropy histograms for trees. Principal Component Analysis may combine features to reduce the dimensionality of the histograms.

Computing device 110 may also include cluster module 118. Cluster module 118 may utilize known clustering techniques, such as affinity propagation, to cluster tree histograms from dimensionality reducer 116.

Computing device 110 also includes classifier 120. Classifier 120 may utilize the results of cluster module 118 to determine the species of a given tree cluster. Classifier 120 may use data stored in tree species dictionary 102 to determine the species of tree clusters.

Computing device 110 also may include renderer 122. In a geographical information system, renderer 122 may use data from classifier 120 and tree detector 112 to render images of trees in a virtual image in accordance with their detected species.

As described herein, geographical information systems may allow users to view a three-dimensional rendering of various locations on the Earth. For example, a user may navigate a virtual camera to a particular location specified by a street address, latitude and longitude coordinates, or other references. The user may see a displayed three-dimensional rendering of the particular location from the standpoint of the virtual camera. The rendering may be created in part by texture-mapping satellite or aerial imagery to the terrain of the Earth, and may include three-dimensional renderings of buildings, trees, streets, and other features that would be present at the location. Three-dimensional models of trees and other features may be used by renderer 122 to accurately depict the location being viewed. The user may navigate through the three dimensional world using her keyboard or mouse to view three-dimensional renderings of other locations, or the user may zoom in and out to view more detail for the location or a wider view.

Tree species dictionary 102 may contain histograms or other representations of various species of trees used as training data. For example, tree species dictionary may have a color, texture and entropy histogram of a broadleaf tree, a palm tree, and a conifer tree. The representations contained in tree species dictionary 102 may have been generated or provided by a user so that classifier 120 accurately classifies clusters of detected trees.

Computing device 110 may also be connected to a network 106, such as a local area network, medium area network, or wide area network such as the Internet. In an embodiment, aerial images 104 may be accessed via network 106.

Each of the modules shown in computing device 110 may be implemented in hardware, software, firmware, or any combination thereof. Software may include one or more applications and an operating system. Hardware can include, but is not limited to, a processor, memory and graphical user interface display. Computing device 110 may also have multiple processors and multiple shared or separate memory components. For example, modules of computing device 110 may be implemented on a clustered computing environment or server farm.

Each of tree species dictionary 102 and aerial images 104 may be stored in a database, which may be implemented in any type of structured memory, including a persistent memory. In examples, each database may be implemented as a relational or non-relational database.

Figure 2:
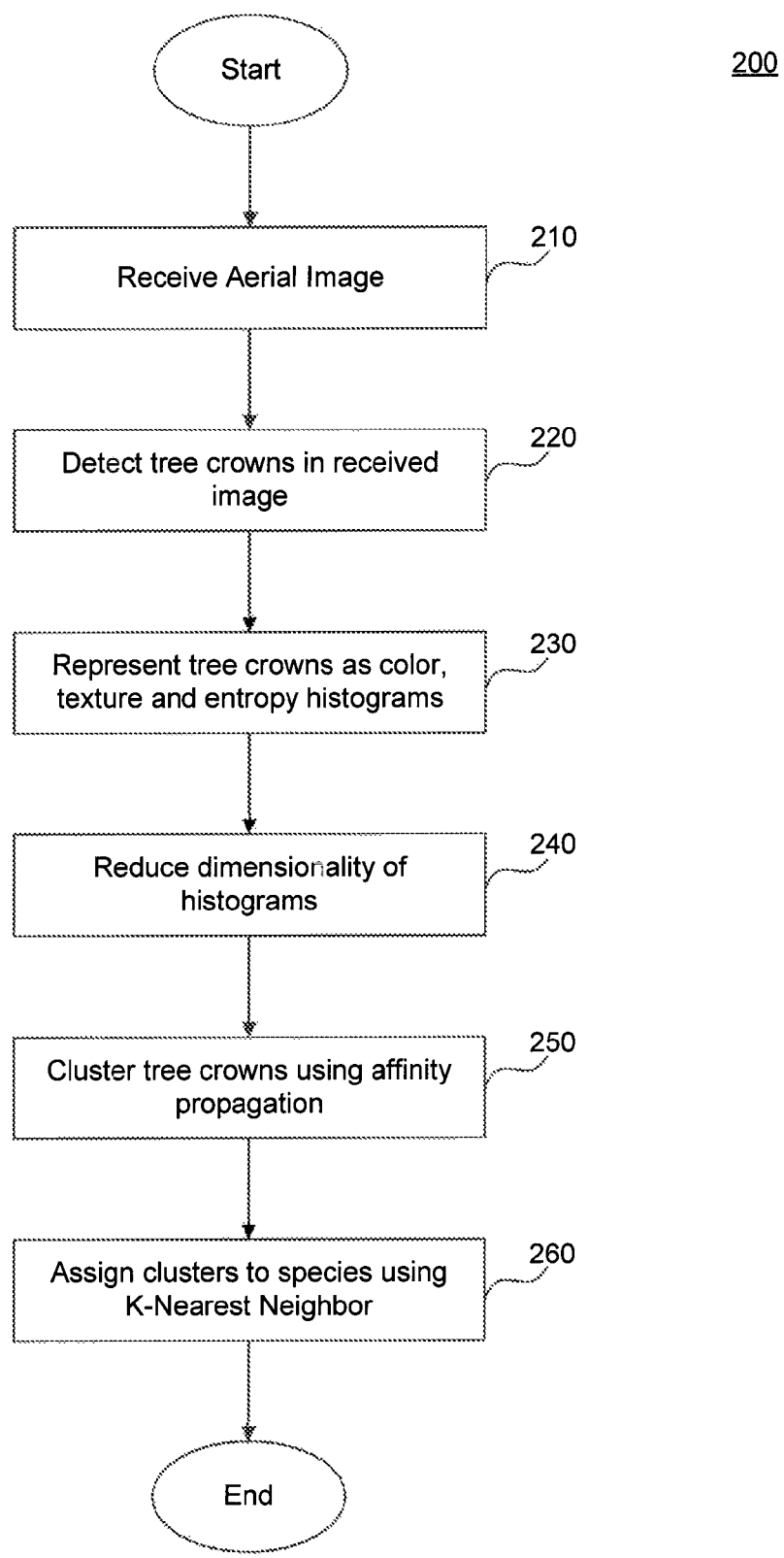
FIG. 2 is a flowchart of a method for determining the species of a tree or group of trees, in accordance with an embodiment.

FIG. 2 is a diagram of a method 200 for detecting the species of a tree or trees from an aerial image.

At step 210, an aerial image is received. The aerial image may have been taken by a camera mounted on a balloon or airplane, or the aerial image may be an image captured from a building or tower. The aerial image may have red, green and blue color channels, also known as an RGB image. The aerial image may contain other channels such as near infrared (NIR) or stereo/altitude information.

At step 220, tree crowns in the received image are detected. Tree crowns may be detected according to known methods, such as methods described in U.S. patent application Ser. No. 12/836,849, titled "Tree Detection From Aerial Imagery", filed Jul. 15, 2010, which is hereby incorporated by reference. At step 220, the crown size of each tree may be determined as well, in accordance with known methods.

At step 230, detected tree crowns are represented as a color, texture and entropy histogram.

For color, the RGB channels of each tree crown may be converted to the CIE L*a*b color space. The CIE L*a*b color space may have a better perceptual uniformity. The L*a*b channels may be combined into a joint histogram for each tree crown. For texture, the first and second order derivatives of a Gaussian distribution may be empirically chosen to form a filter-bank. The filter-bank may be formed by a first and second order derivative of a Gaussian distribution on 3 scales and 6 orientations, generating an 18-dimensional feature vector at each pixel. The texture histogram may also be computed by using the distance between the feature vector of each pixel and the clustered feature vectors in the tree species dictionary. For the entropy histogram, the entropy of tree-crown pixels may be grouped into 128 bins to generate a histogram.

Representing detected tree crowns as a combination of color, texture and entropy histograms may allow a quantitative representation of each tree.

At step 240, the dimensionality of each histogram is reduced. In embodiments, Principal Component Analysis (PCA) is used to reduce the dimensionality of each histogram. Principal Component Analysis reduces a multi-dimensional data set to lower dimensions to facilitate analysis.

At step 250, visually proximal tree crowns are clustered together. Tree crowns are clustered together based on their color, texture and entropy histogram representations. Each cluster may be assigned a unique identifier. In embodiments, affinity propagation is used to cluster tree crowns together. Other clustering techniques may be used as well.

At step 260, each cluster is assigned to a species using a k-Nearest Neighbor classifier. The k-Nearest Neighbor classifier may classify the cluster according to the species of the closest training data. For example, if a given cluster exhibits a greater similarity to a conifer tree in the training data than a palm tree in the training data, the k-Nearest Neighbor classifier will classify the cluster as a conifer cluster. This data may be stored in, for example and without limitation, a database. The training data used in the operation at step 260 may be stored in a tree species dictionary.

Using the k-Nearest Neighbor classification of a tree cluster, each detected tree in the aerial image may be associated with a location, crown size, and a species prediction. The location may be stored as a set of latitude and longitude coordinates or other positioning information. This information may be stored for use in rendering in geographic information systems.

In embodiments, the number of clusters created at step 250 may be greater than the number of species present in the aerial image. This may be done to ensure that trees present in the same cluster are highly likely to be of the same species.

Additionally, after step 250, a quality assurance process may be implemented to ensure that trees that are clustered together are similar. A user controlling the tree detection process may perform the quality assurance process.

In an embodiment, a quality assurance process may be implemented after step 260 as well. For example, the k-Nearest Neighbor classifier may determine that three species in the training data closely match a given cluster. A quality assurance process may perform a more detailed analysis on the cluster and the three potential species exhibited by the training data to determine which species best fits the cluster. The quality assurance process may be implemented by a user, or by other machine learning techniques.

A quality assurance process may improve the classification process in other ways. For example, if a number of trees in a given area are all classified incorrectly, a quality assurance process that corrects one of the trees may automatically correct the other trees in the same cluster.

In an embodiment, multiple aerial images may be received at step 210. Thus, clusters may be created that span multiple images. Such clusters may be classified as belonging to a species in accordance with step 260. In a further embodiment, multiple clustering processes or classification processes may operate in parallel.

In an embodiment, tree species dictionary 102 contains training data including various trees of various species that have been encoded as color, texture and entropy histograms. These histograms have also had their dimensionality reduced according to Principal Component Analysis. This process may facilitate step 260 of method 200, where each cluster is assigned a species.

In embodiments, other clustering techniques may be used at step 250 of method 200. For example, instead of affinity propagation, a k-Means clustering algorithm may be used to generate clusters of similar color, texture and entropy histograms.

In embodiments, classification techniques other than k-Nearest Neighbor may be used at step 260 of method 200. For example, a random forest or other statistical classification method may be used.

Once each cluster is assigned to a species at step 260, this information may be used in a geographical information system to accurately render the distribution of trees in a given image. As described above, each tree in an aerial image may be associated with a location, crown size, and species. Thus, when viewing a given area in a geographical information system, this information may be used to accurately render trees in the currently viewed area.

Figure 3A:
FIG. 3A is an exemplary rendering of trees in a geographic information system, according to embodiments.
Figure 3B:
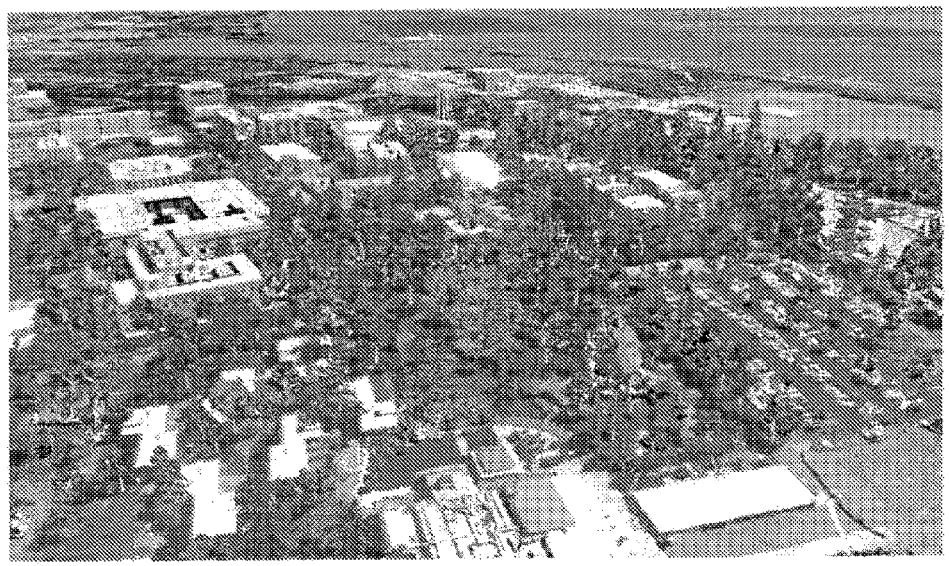
FIG. 3B is a further exemplary rendering of trees in a geographic information system, according to embodiments.

For example, a user may select a given area of the earth to view in a geographical information system. The viewed area may be defined by a three-dimensional view frustum such as, for example, a truncated three-dimensional pyramid. Based on tree location, crown size, and species information as described herein, trees may be rendered in the user-specified area according to such information. FIGS. 3A and 3B are sample images of a geographical information system rendering of trees in accordance with embodiments. The images of FIGS. 3A and 3B may be rendered after tree species have been detected in an aerial image by computing device 110 in accordance with method 200, and rendered by renderer 122.

Although embodiments are described with reference to aerial images and renderings of trees, it is to be appreciated that one of ordinary skill could adapt embodiments to detect the species of other geographic features. For example, the steps of method 200 may be adapted to detect more accurately characteristics of bushes, grass, or other patches of vegetation present in an aerial image to improve renderings of such features in geographical information systems. Similarly, the steps of method 200 may be adapted to determine characteristics of water areas, such as depth, so that this information may be used by a user of geographical information systems.

Non-organic features may also be classified by adapting embodiments disclosed herein. For example, detecting and clustering buildings according to their linear features may allow classification of such buildings according to an architectural style or other features of interest. Thus, in a geographical information system, a user may be able to view a building and also determine additional data about the building, such as its height or architectural style.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method, comprising:
   (a) receiving an image of a portion of the Earth;
   (b) detecting one or more tree crowns in the image;
   (c) for each of the one or more tree crowns:
      (i) representing the respective tree crown as a color, texture and entropy histogram;
      (ii) reducing the dimensionality of the color, texture and entropy histogram to produce a reduced dimensionality color, texture, and entropy histogram;
   (d) clustering, into one or more clusters, similar reduced dimensionality color, texture and entropy histograms for the one or more tree crowns;
   (e) assigning each cluster to a tree species to match each detected tree crown to a corresponding tree species;
   (f) receiving a desired view frustum; and
   (g) rendering a three-dimensional image according to the desired view frustum, wherein the rendering includes one or more trees rendered based on an assigned tree species of a cluster.

2. The method of claim 1, wherein the image is an aerial image.

3. The method of claim 1, the assigning (e) comprising assigning each cluster to a tree species using a k-Nearest Neighbor classifier.

4. The method of claim 1, the clustering (d) comprising clustering, into one or more clusters, similar tree crown color, texture and entropy histograms using affinity propagation.

5. The method of claim 1, the reducing (c)(i) comprising reducing the dimensionality of each tree crown color and texture histogram using Principal Component Analysis.

6. The method of claim 2, wherein the aerial image is an RGB aerial image.

7. A non-transitory computer readable storage medium having instructions stored thereon that, when executed by a processor, cause the processor to perform operations including:
   (a) receiving an image of a portion of the Earth;
   (b) detecting one or more tree crowns in the image;
   (c) for each of the one or more tree crowns:
      (i) representing the respective tree crown as a color, texture and entropy histogram;
      (ii) reducing the dimensionality of the color, texture and entropy histogram to produce a reduced dimensionality color, texture, and entropy histogram;
   (d) clustering, into one or more clusters, similar reduced dimensionality color, texture and entropy histograms for the one or more tree crowns;
   (e) assigning each cluster to a tree species to match each detected tree crown to a corresponding tree species;
   (f) receiving a desired view frustum; and
   (g) rendering a three-dimensional image according to the desired view frustum, wherein the rendering includes one or more trees rendered based on an assigned tree species of a cluster.

8. The computer readable storage medium of claim 7, wherein the image is an aerial image.

9. The computer readable storage medium of claim 7, the assigning (e) comprising each cluster to a tree species using a k-Nearest Neighbor classifier.

10. The computer readable storage medium of claim 7, the clustering (d) comprising the tree crown color, texture and entropy histograms into one or more clusters using affinity propagation.

11. The computer readable storage medium of claim 7, the reducing (c)(i) comprising the dimensionality of each tree crown color, texture and entropy histogram using Principal Component Analysis.

* * * * *